UNITED STATES PATENT OFFICE.

WILLIAM KLING, OF GALLIPOLIS, OHIO.

IMPROVEMENT IN MOLDERS' FACING-POWDER.

Specification forming part of Letters Patent No. 193,662, dated July 31, 1877; application filed November 16, 1876.

*To all whom it may concern:*

Be it known that I, WILLIAM KLING, of Gallipolis, in the county of Gallia, and State of Ohio, have invented a new and useful Improvement in Molders' Facing for giving a clean and bright surface to iron castings, of which the following is a specification:

This invention relates to that class of compositions of matter employed for giving clean and bright surfaces to iron castings during the process of casting.

The compound or mixture is composed of the substance called sometimes, and by me, "German and Missouri Clay," and of charcoal mixed and ground up fine. This compound is dusted upon the molds through the medium of what is called the "dust-bag."

I make the mixture or compound in the following manner: A plastic and refractory clay, found in abundance on the Waverly sandstone in the Ohio carboniferous formations, and having the following analysis—(see Ohio Geological Survey of 1870, p. 169:)

| | |
|---|---:|
| Silicic acid, (sand) | 61.90 |
| Alumina, with a trace of iron | 22.80 |
| Lime | 0.05 |
| Magnesia | 0.70 |
| Water | 12.90 |
| Potash and soda | 0.90 |
| | 99.25 |

This refractory clay answers well. Indeed, any clay not having too much oxide of iron, lime, potash, or soda in its composition will answer, as, for instance, the New Jersey Amboy clay, the Maryland Mount Savage clay. Any of the kaolins resulting from the decomposition of feldspars and granites of the primitive formations will answer my purpose well, or any clay consisting of a preponderance of sand and alumina, or holding those elements in equal proportions, and not having more lime, soda, oxide of iron, or potash than the analysis given, will do well.

Clay containing oxide of iron, potash, soda, lime, &c., and generally found underlying coal veins, will not do at all. Potters' clay, sometimes called pipe-clay, and containing lime, and so on, will not do at all.

Such clay as that analysis shows for which Rees B. Smith obtained Letters Patent No. 56,817, July 31, 1866, I could not use at all in my compound. Nor could I use any of the materials spoken of in the Letters Patent Nos. 34,524 and 49,272.

The clay used by Bart Kane, and for which he obtained Letters Patent No. 147,138, February 3, 1874, he calls "fire-clay." If a fire-clay, then it must contain some element that requires the presence of the manganese or the oxide of manganese to neutralize its effects in the molds. Anyhow, he may with propriety call any of the many kaolins "fire-clay," for all refractory clays may be called fire-clay—as, for instance, common plastic clay, potters' clay, pipe-clay, China-clay, slate-clay found under coal-veins, and all clays, for they will all resist the action of fire to a certain degree, or rather in exact proportions to the amount of fusible compounds that may be contained in them. As is well known, if one part of alumina, one part of lime, and three parts of sand be mixed well together, it will form a compound that is very fusible, and will melt readily, and would not do at all for my facing; but if the proportion of sand be increased to five parts the compound becomes, in metallurgical phrase, an infusible compound, and is what I want in my facing.

From the above it will be understood that what I use in the shape of clay for my compound is a refractory material or clay composed of sand and alumina, with as little lime, potash, soda, &c., as possible.

I make the mixture as follows: I take one part of the clay to seven parts of carbon, such as charcoal or coke by measure. By weight I put about thirty pounds of clay to about forty-two pounds of charcoal, coke, plumbago, or gas-retort residuum. I mix and grind up very fine. The highest proportion I put is one of clay to five of carbon in the dry state—the lowest, one part of clay to seven of carbon, in the dry state, by measure.

The proportions as laid down in Patent No. 147,138 of three parts fire-clay to five parts carbon will not do at all in my compound, but may do in admixture with manganese.

My compound is made without the expensive ingredient, manganese, and is, therefore, much cheaper and far better.

My facing compound will produce better results than any of the facings before mentioned, or any in use to-day, and costs less by one half. It is used the same way as the other facings.

With regard to the chemical reaction of the elements of the compound during the running of the molten iron, and afterward, I would say that to attempt to explain it would be speculation and presumption. All I know in the matter is that the results with my facing are satisfactory—more so than with any of the others.

I know also that my facing will not run or wash, and is perfectly fire-proof or refractory, and does not need the use of manganese, lime, or cement to fix it, and that it produces first-class castings with clean metallic surfaces, and of a good color.

I do not claim the use of fire-clay, or rather what is commonly called fire-clay, in my compound for molders' facing.

Having thus described my invention, the manner and mode in which the same is used, I would observe that what I consider novel and original, and therefore claim as my invention, and desire to secure by Letters Patent, is as follows:

1. The combination of a refractory clay having the above analysis, or nearly so, in admixture with carbonaceous matter, as a molders' facing for foundry purposes, substantially as described.

2. The combination of a refractory clay having the above analysis, or nearly so, in admixture with carbonaceous matter in the proportion of one part of the clay with from five to seven parts of the carbonaceous matter, substantially as and for the purpose described.

WILLIAM KLING.

Witnesses:
WM. GRIFFITH, Jr.,
A. VANCE.